United States Patent [19]

Yost

[11] 3,800,944

[45] Apr. 2, 1974

[54] COALESCENCE OF WATER AND OLEOPHILIC LIQUID DISPERSIONS BY PASSAGE THROUGH A BED OF AN ION EXCHANGE RESIN

[75] Inventor: Marvin E. Yost, Ponca City, Okla.

[73] Assignee: Continental Oil Company, Ponca City, Okla.

[22] Filed: May 24, 1972

[21] Appl. No.: 256,299

[52] U.S. Cl............... 210/23, 210/40, 210/DIG. 21
[51] Int. Cl...................... B01d 15/04, B01d 17/04
[58] Field of Search................. 210/23, 40, DIG. 21

[56] References Cited
UNITED STATES PATENTS

| | | | |
|---|---|---|---|
| 3,617,548 | 11/1971 | Willihnganz | 210/23 |
| 3,457,169 | 7/1969 | Schneider | 210/23 |
| 3,729,410 | 4/1973 | Abadie et al. | 210/DIG. 21 |

OTHER PUBLICATIONS

"Industrial and Engineering Chemistry", January, 1955, p. 71–74.

*Primary Examiner*—Samih N. Zaharna
*Assistant Examiner*—Ivars Cintins
*Attorney, Agent, or Firm*—Bayless E. Rutherford, Jr.; A. Joe Reinert

[57] ABSTRACT

Dispersions of an oleophilic liquid and water are coalesced by passing through a bed of particles of an ion exchange resin which is equilibrated with respect to sorption of the oleophilic liquid.

8 Claims, No Drawings

3,800,944

COALESCENCE OF WATER AND OLEOPHILIC LIQUID DISPERSIONS BY PASSAGE THROUGH A BED OF AN ION EXCHANGE RESIN

BACKGROUND OF THE INVENTION

This invention relates to coalescence of dispersions of oleophilic liquids and water.

Coalescence of dispersions of water and oleophilic liquids is of major importance to industry in the prevention of pollution of the environment and in the conservation of natural resources. Exemplary of a few of the applications are the following: in oil fields, waste waters must have hydrocarbon dispersions removed therefrom prior to surface release; brine or fresh water injection fluid should have hydrocarbon dispersions removed therefrom prior to use in waterflood operations; hydrocarbons should be recovered from brine waste water prior to disposal in underground formations in order to conserve valuable hydrocarbon resources; waste water streams from offshore platforms should have hydrocarbon dispersions removed therefrom before disposal. Streams employed in and released from refineries should or must have oleophilic liquid dispersions removed therefrom. In the wood processing industry, removal of phenolic dispersions from waste waters from creosote treatment is a major problem. In heavy industry, removal of oil from waste waters of aluminum rolling mills, the reclamation of cutting oils, and the removal of oil from brine prior to mineral recovery are important applications. In the metals extraction industry, entrained solvents from raffinate or preg liquor solutions should be recovered. Particularly important applications are evident in marine operations wherein oil should be removed from tanker ballast discharge waters, oil dispersions should be recovered from bilge pump discharge waters, and dispersions should be removed from the separated water discharge from oil spill skimming devices. Many other applications are evident to those skilled in the art, and any process which improves the recovery of oleophilic liquids from dispersions of oleophilic liquids in water is of major importance to industry and the population as a whole in the prevention of environmental pollution and in the conservation of natural resources.

The separation of oleophilic liquids from water wherein the dispersion is of water in the oleophilic liquid is also of major importance. In particular, the removal of dispersions of water in fuels is important to prevent icing during cold weather operation.

Many processes have been developed to remove dispersions of oleophilic liquids from water. However, a major problem still exists, particularly in the petroleum industry, and particularly in the removal of low concentrations of hydrocarbons which are dispersed in water.

OBJECTS OF THE INVENTION

One object of the invention is to coalesce dispersions of water and oleophilic liquids.

Another object is to separate dispersions of water and oleophilic liquids by coalescing the dispersions and thence separating the water phase from the oleophilic liquid phase.

SUMMARY OF THE INVENTION

In one aspect, this invention relates to coalescing a dispersion of an aqueous liquid and an oleophilic liquid by passing the dispersion through a bed of a synthetic ion exchange resin which is equilibrated with respect to sorption of the oleophilic liquid.

DESCRIPTION OF THE PREFERRED EMBODIMENTS

According to the process of this invention, a dispersion of an aqueous liquid and an oleophilic liquid is passed through a bed of particles of a synthetic ion exchange resin which is equilibrated with respect to sorption of the oleophilic liquid.

Dispersions comprised of water and an oleophilic liquid which can be coalesced according to the process of this invention can be either dispersions of oleophilic liquid in water or dispersions of water in oleophilic liquid.

The term oleophilic liquid as employed in this application includes any material which is a liquid at a temperature at which water or an aqueous metallic salt solution can exist in a liquid phase, and which is substantially insoluble in water or an aqueous salt solution. By substantially insoluble is meant less solubility than about 1 part by weight of material per 100 parts by weight of water or aqueous metallic salt solution.

Preferably, the oleophilic liquid is a liquid petroleum hydrocarbon which is a liquid at a temperature in the range of 0° to 100°C. The term "liquid petroleum hydrocarbons" includes natural petroleum products, distillates or fractions thereof, and refined or synthesized products which can be derived from petroleum. Examples of such liquid petroleum hydrocarbons include various crude oils, natural gasolines, condensates, kerosines, gasolines, naphthas, recycle oils, alkylates, fuel oils, benzene, toluene, hexane, bunker oils, lubricating oils, and the like. The process of the invention is presently believed to be particularly applicable to removing dispersions of crude oil from production waters.

The water phase of dispersions which are separated according to the process of the invention can be pure water or can be an aqueous solution or liquid having a soluble metal salt dissolved therein. Examples of some common metal salts which are dissolved in water to form aqueous liquids or solutions and which are commonly encountered include sodium chloride, sodium bromide, magnesium chloride, calcium chloride, sodium sulfate, and the like. Often, such aqueous liquids are derived from natural subterranean brines or from surface waters. There is no limit to the amount of metallic salt which such aqueous solutions contain dissolved therein except the solubility of the particular metallic salts. Usually such aqueous solutions do not contain over about 25 percent by weight of metallic salts.

The ion exchange resin which is employed according to this invention can be any synthetic organic ion exchange resin as defined in Kirk-Othmer, "Encyclopedia of Chemical Technology", 2nd Edition, Vol. 2, pages 871-899 (1966), meeting the following requirements. The synthetic ion exchange resin must be substantially completely insoluble in the oleophilic liquid employed. The resin must also be substantially completely insoluble in the aqueous liquid. The resin must be chemically stable in the presence of the oleophilic liquid and in the presence of the aqueous liquid. The synthetic ion exchange resin must also be physically stable in contact with the oleophilic liquid and the aqueous liquid under the conditions employed to effect coalescence according to the invention.

Examples of suitable synthetic ion exchange resins are well known to those skilled in the art and are available from a number of commercial sources. The disclosure of Kirk-Othmer, "Encyclopedia of Chemical Technology", 2nd Edition, Vol. 2, pages 871-899 (1966); of "Dowex::Ion Exchange", Dow Chemical Company, Midland, Mich., (1958); particularly pages 69-73; and of "Synthetic Ion - Exchangers", Osborn, (1956), MacMillan Company, particularly on pages 23-25; disclose a wide variety of suitable synthetic ion exchange resins, sources thereof, and methods of preparation therefor. These authorities are incorporated by way of reference. Any of the syntehtic ion exchange resins described in these authorities as well as similar materials known to the art which meet the criteria above specified can be employed according to the process of this invention.

Particles of synthetic ion exchange resins are employed in beds according to the process of this invention. Such particles can have a U.S. standard sieve size of about 5 to 200. Presently, it is particularly preferred to employ particles having a U.S. standard sieve size of about 10 to 100. The particles of synthetic ion exchange resins can be in any suitable form, but the greatest dimension of the particles should not be more than five times the smallest dimension. If desired, the particles of synthetic ion exchange resin can be adhered together so as to form a bed which is a single integral unit having porosity. Adhesion of the particles together can be by use of a suitable adhesive or by sintering. Presently, it is preferred to employ the synthetic ion exchange resin particles as bed which is not adhered together.

The process of this invention is particularly applicable for coalescing liquid petroleum hydrocarbons from dispersions of liquid petroleum hydrocarbons in water (or brine). Most satisfactory results are often obtained when such dispersions have in the range of a trace to 1 part by weight of liquid petroleum hydrocarbon per 100 parts by weight of aqueous solution, but dispersions having more than 1 part per 100 can also be satisfactorily separated. Indeed, the process of the invention is applicable for coalescing a dispersion comprising water and an oleophilic liquid wherein the oleophilic liquid comprises any insoluble portion of the dispersion.

According to this invention, the bed of ion exchange resin particles through which the dispersion is passed must have become so saturated with oleophilic liquid under the particular flowing conditions employed that coalescence has begun. In other words, it must be equilibrated.

The bed of ion exchange resin particles through which the dispersion is passed should be equilibrated with respect to the oleophilic liquid in the particular environment that the bed is located. That is, the bed should have become so saturated with oleophilic liquid under the particular flowing conditions employed, that coalescence has begun.

According to a presently preferred mode of operation, temperatures of about 0°-100°C are employed. However, the only requirement with regard to temperature is that both oleophilic liquid and aqueous liquid be in the liquid state. Pressures near atmospheric are preferred because of convenience, though higher or lower pressures can be employed if desired. If gases are dissolved in the oleophilic liquid and/or aqueous phase, pressure sufficient to maintain the gases in solution is preferred. A rate of flow of about 50 to 1000 barrels of dispersion per square foot of bed area per day is presently preferred for most satisfactory results. However, higher or lower rates of flow can be employed if desired.

According to one presently particularly preferred mode of operation, the process of the instant invention is employed to coalesce a dispersion of a liquid petroleum hydrocarbon in water, said dispersion being the aqueous effluent from a conventional API separator, wherein the effluent is polished to a very low level of hydrocarbon in water.

According to one presently preferred mode of operation, a bed of particles of an ion exchange resin is situated so as to fill a vessel. A dispersion comprising an oleophilic liquid in water (or aqueous solution) is passed upwardly through the bed. Upon equilibration of the bed, the oleophilic liquid of the dispersion is coalesced into droplets which then, if less dense than the aqueous liquid, rise to the top of a liquid reservoir situated above the ion exchange resin bed. Thereupon, the oleophilic liquid forms a layer situated above the aqueous layer if the oleophilic liquid is less dense than the aqueous layer. Most oleophilic liquids are less dense than water. Portions of the oleophilic liquid layer and the aqueous liquid layer are continually drawn off, thus effecting separation.

Though a continuous flow upward through a bed of ion exchange resin particles constitutes one presently preferred mode of operation, the invention is not so limited. The flow of dispersion can be downward through the bed or can be in a horizontal direction. The bed can often preferably be employed as a wrapping around a pipe having orifices throughout the region in contact with the bed, the bed being consolidated in a suitable form or held in place by suitable retainers.

In one presently preferred configuration, the bed, if unconsolidated, is retained by retainers such as screens to maintain the integrity of shape of the particle bed.

If dissolved gases are present in the oleophilic liquid or aqueous liquid, a sufficient pressure is preferably maintained on the system to keep such gases in solution. Otherwise, gas breaking through the bed has a propensity to cause small oleophilic liquid droplets to prematurely break from the bed. Such droplets of small size are less desirable in that separation into an oleophilic liquid phase and an aqueous phase is less efficient.

To separate some dispersions, a mixture of particles of two or more ion exchange resins can be employed or adjacent beds of different ion exchange resins can also be employed.

The following examples are presented to more clearly and fully disclose the invention, but should not be construed as limiting the invention in any manner.

EXAMPLE 1

An elongated cylindrical coalescer fabricated of Lucite plastic having an internal diameter of seven-eighths-inch, having a long axis in a vertical plane, having an inlet at the bottom, having a bed depth of 5 inches of 20-50 U.S. mesh size synthetic ion exchange resin, having an aqueous liquid outlet near the bottom of the separation reservoir, and having an oil outlet near the top of the separation reservoir, was set up. The cross-sectional area of the ion exchange resin bed was $4.17 \cdot 10^{-3}$ square feet and the volume was $1.74 \cdot 10^{-3}$ cubic feet.

From the South Ponca field of Oklahoma is produced a crude oil designated Ponca crude oil having a 43°API gravity. Dispersions were prepared of the Ponca crude oil in water to have oil and water concentrations of 690, 322, and 295 parts per million. Such dispersions were then passed through the coalescer above described.

The dispersion having 690 parts per million of Ponca crude oil and water was passed at an average rate of 217 barrels per day per square foot of coalescer surface. The aqueous effluent concentration from the coalescer had two parts per million of oil present therein. Likewise, the dispersion having the 322 parts per million of oil was passed at an average flow rate of 205 barrels per day per square foot to yield an effluent having a concentration of 2.8 parts per million. In another run, the flow rate was 75.7 barrels per day per square foot of a dispersion having 295 parts per million of oil in water. The effluent concentration from this run was one part per million of oil in water.

The drops of coalesced oil were quite large, being several millimeters in diameter. Thus, separation was readily effected at high flow rates. The temperature was 25°C.

The ion exchange resin bed employed in these runs was made up of 50 volume percent 20-50 U.S. mesh size particles of sodium form resin of Nalcite HCR-W ion exchange resin and 50 percent by volume of Dowex 1-X8 20-50 mesh chloride form ion exchange resin.

Nalcite HCR-W sodium form ion exchange resin is a strongly acidic cation exchange resin produced by the Nalco Chemical Company of Chicago, Ill. It contains sulfonic acid groups as its functional groups which are attached to a styrene-divinyl-benzene copolymer. The resin is 8 percent cross-linked. The resin was employed in the sodium form as supplied by the supplier. Other properties of the resin are disclosed in the 4th Edition of "Chemical Engineers' Handbook."

Dowex 1-X8, 25-50 U.S. mesh size, chloride form ion exchange resin is a strongly basic anion exchange resin produced by the Dow Chemical Company of Midland, Mich. It contains quaternary ammonium groups as its functional groups which are attached to a styrene-divinyl-benzene copolymer. The material is 8 percent cross-linked. The resin was employed in the chloride form as supplied by the supplier. Other properties of the resin are disclosed in the book, "Dowex::Ion Exchange" heretofore referenced.

EXAMPLE 2

An elongated cylindrical coalescer fabricated of Lucite plastic having an internal diameter of 3 inches, having a long axis on the vertical plane, having an inlet at the bottom, having a bed depth of 6 inches of Nalcite HCR-W, 20-50 U.S. mesh size, sodium form ion exchange resin, the resin bed having a cross-sectional area of $4.9 \cdot 10^{-2}$ square feet, the resin bed having a volume of $2.45 \cdot 10^{-2}$ cubic feet, the coalescer having a separation reservoir above the resin bed, having an aqueous liquid outlet near the bottom of the separation reservoir, and having an oil outlet near the top of the separation reservoir, was set up.

In the South Ponca field of Oklahoma, associated with the production therefrom, is a dispersion of South Ponca crude oil (43°API gravity) in water having a temperature of 90°F, and having an oil concentration ranging from 100-200 parts per million therein.

The oil in water dispersion of the South Ponca field was passed to the coalescer and then through the ion exchange resin bed. After sufficient of the dispersion had passed through the ion exchange resin bed, to equilibrate the ion exchange resin bed, coalescence was initiated. Continued upward passage of the dispersion, coalescence thereby, and separation of the oil which was drawn from the top of the separation reservoir, and water which was drawn from the bottom of the separation reservoir situated above the ion exchange resin bed, effected separation into oil and water components.

The following table presents data demonstrating the operation of the coalescer.

Table I

| Average Flow Rate, (BPD/Ft²) | Oil Conc. in Field, (ppm) | Oil Conc. in Effluent (ppm) |
| --- | --- | --- |
| 304 | 164 | 3.5 |
| 304 | 164 | 4.2 |
| 304 | 142 | 4.6 |
| 304 | 142 | 4.1 |
| 304 | 142 | 3.8 |
| 304 | 142 | 6.0 |

This example demonstrates further examples of the effective coalescence of oleophilic liquid from an oleophilic liquid-in-water dispersion by passing through a bed of particles of an ion exchange resin which is equilibrated with respect to sorption of the oleophilic liquid.

EXAMPLE 3

A series of runs similar to the runs of Example 2 are effected with the only exception being that a sizeable number of strongly acid, weakly acid, strongly basic, and weakly basic synthetic ion exchange resins are substituted in place of the ion exchange resin of Example 2. Similar results are obtained demonstrating that a wide scope of synthetic organic ion exchange resins of both anionic exchange and cationic exchange type are useful to coalesce dispersions of oleophilic liquid and aqueous liquid.

I claim:

1. A process for coalescing and separating a dispersion comprised of water and an oleophilic liquid, the dispersion being more readily separable by gravity following coalescence than before, wherein the process comprises passing the dispersion through a bed of particles of an ion exchange resin, in intimate contact with the particles of the ion exchange resin, the ion exchange resin being sufficiently saturated with respect to sorption of the oleophilic liquid that coalescence has begun, at a rate of flow sufficiently low to effect a coalescence of the disperse phase of the dispersion permitting the thus coalesced dispersion to separate into a layer comprised of the oleophilic liquid and a layer comprised of water; and withdrawing the separate layers.

2. The process of claim 1 wherein the dispersion comprising water and oleophilic liquid is a dispersion of a liquid petroleum hydrocarbon in water.

3. The process of claim 1 wherein the dispersion comprising water and oleophilic liquid is a dispersion of water in a liquid petroleum hydrocarbon.

4. The process of claim 1 wherein the dispersed phase consists essentially of a liquid petroleum hydrocarbon wherein the continuous phase consists essentially of water, wherein the dispersion is continuously passed through a bed of particles of a synthetic ion exchange resin which is equilibrated with respect to the liquid petroleum hydrocarbon.

5. The process of claim 4 wherein the rate of passing of the dispersion through the liquid hydrocarbon equilibrated bed of particles of a synthetic ion exchange resin is 50 to 100 barrels per day per square foot of bed surface, wherein the liquid petroleum hydrocarbon phase thus coalesced is then separated from the water phase, and wherein the operating temperature is 0° to 100°C.

6. The process of claim 5 wherein the flow of dispersion through the equilibrated bed of synthetic ion exchange resin is in an upward direction.

7. The process of claim 6 wherein the synthetic ion exchange resin is a strongly basic anion exchange resin containing quaternary ammonium groups as its functional groups which are attached to a styrene-divinyl-benzene copolymer.

8. The process of claim 6 wherein the synthetic ion exchange resin is a strongly acidic cation exchange resin containing sulfonic acid groups as its functional groups which are attached to a styrene-divinyl-benzene copolymer.

* * * * *